Patented Mar. 10, 1942

2,275,814

UNITED STATES PATENT OFFICE 2,275,814

COATED SHEET MATERIAL

Allen Abrams and George W. Forcey, Wausau, and Charley L. Wagner, Menasha, Wis., assignors to Marathon Paper Mills Company, Rothschild, Wis., a corporation of Wisconsin No Drawing. Application November 14, 1939, Serial No. 304,412

4 Claims. (Cl. 91—70)

This invention relates to a coated sheet material consisting of a highly stretchable thermoplastic base sheet coated with a highly stretchable thermoplastic coating having a relatively lower softening point than the base sheet. More specifically, this invention relates to a rubber hydrochloride sheet coated with a highly stretchable thermoplastic coating such as a composition of wax and rubber.

The usual compositions for coating sheet materials for imparting water- and moistureproofing properties thereto have relatively little stretchability. Consequently such materials have been suited primarily for coating sheet materials of low stretchability. Among the transparent sheets of such relatively low stretchability are cellulose acetate, ethyl cellulose and regenerated cellulose films, all of which stretch less than 25% at ordinary temperature and humidity before reaching their elastic limit. The water- and moistureproofing compositions for coating such types of transparent films ordinarily comprise cellulose ethers, cellulose esters and the like. Such materials have generally been satisfactory for the usual type of base sheet.

However, when a highly flexible and stretchable base sheet such as a rubber hydrochloride sheet is coated with the usual water- and moistureproofing compositions, the product is not satisfactory on account of the great disparity in the stretchability of the base sheet and the coating film. When a sheet of commercial Pliofilm (rubber hydrochloride), for example, is first coated with the water- and moistureproofing compositions now generally in use, and then stretched, it will be found that the coating film breaks and loses its continuity because the base sheet of Pliofilm can be stretched as much as 400% of its original length whereas the coating film does not have an equal stretchability. Hence it is important that any coating used on Pliofilm should have approximately the same degree of stretch as the base sheet of Pliofilm.

The present invention overcomes this coating difficulty by providing a base sheet of rubber hydrochloride film with a highly stretchable thermoplastic composition comprising, for example, wax and rubber, prepared under the conditions as described in Abrams et al. Patents 2,054,112 and 2,054,115. The coating composition is prepared by melting paraffin-wax or any other suitable waxy substance and adding thereto a sufficient amount of film forming substance, such as rubber, from about 6 to 30% by weight, in order to produce a uniform homogeneous composition having a viscosity of at least 8,000 seconds (50 cc. at 90° C. measured on a Scott viscosimeter). The composition should be prepared under carefully controlled conditions of temperature and time of mixing as fully disclosed in the previously mentioned Abrams et al. patents. The coating composition may be prepared of any waxlike or waxy substance and a film-forming substance such as rubber, synthetic rubbers, Vistanex (isobutylene polymer), natural or synthetic resinous materials which are compatible with wax, gutta percha, balata, smoked sheet rubber, chlorinated rubbers, rubber hydrochloride, isoprene polymers and the like. These film forming substances may be used singly or in mixtures thereof compatible with the wax or waxy materials employed. Natural or synthetic waxy materials may be used in our composition such as candelilla wax, spermaceti, beeswax, paraffin-wax, carnauba, synthetic waxes, hydrogenated cottonseed oil, hydrogenated fish oil, amorphous or micro-crystalline waxes and the like.

In compounding, for example, a composition of paraffin-wax and pale crepe rubber, the wax is first melted and maintained at a temperature of say from 180 to 200° F. The rubber, preferably in the form of thin pale crepe sheets, is added to the molten wax and stirred until the rubber is completely penetrated by the wax. The mixture is then thoroughly stirred in a Werner-Pfleiderer mixture for about one and one-half to two hours while the temperature is maintained at around 180 to 190° F. until a uniform homogeneous composition is obtained. As soon as the mixture is smooth it is coated, while hot, upon the base sheet of Pliofilm by running the Pliofilm over a roll kept to the relatively low temperature, for example, of 125 to 150° F., and applying the coating at a temperature of about 180° F. so as to prevent distortion of the base film. The application of the coating is regulated to produce the desired thickness of the coating on the base sheet.

When commercial Pliofilm is coated with a wax-rubber composition as previously explained, a translucent coated sheet is produced which may be stretched as much as 400% of its original length without separating the coating layer from the base sheet or breaking its continuity. Furthermore, the wax-rubber composition adds materially to the moistureproofness of the sheet.

According to the present invention a remarkable and unusual type of coated sheet material is produced. Pliofilm is thermoplastic, but has a relatively high softening point, say from 200 to 250° F., so that when this sheet is heat sealed to itself distortion of the film often occurs on account of the relatively high temperatures necessary to bring about heat sealing. This difficulty is overcome in our invention by providing a coating of thermoplastic composition which has a lower softening point than the base sheet so that heat sealing of the base sheet may be effected more easily without distorting the base sheet, by utilizing the coating as a sealing medium.

Pliofilm also has a number of valuable properties for packaging foods as it has flexibility, stretch, high moistureproofness and heat sealing properties. However, it has been found that in packaging foods Pliofilm may impart a taste and undesirable odor to foodstuffs with which it may come in direct contact. The thermoplastic coating applied to the Pliofilm according to the present invention overcomes this difficulty as no odor or taste will be imparted to the foodstuffs when the coated side of the Pliofilm is applied in contact with foodstuffs.

A further advantage of the sheet material produced according to the present invention is that the Pliofilm and the stretchable thermoplastic coating applied thereto are highly waterproof so that the combined coated sheet will stand up well together and the coating will not separate from the base sheet even when the coated sheet has been exposed for a long time to water. As previously pointed out, the coated sheet may be stretched as much as 400% of its original length yet the coating thereon will remain continuous and adherent to the base sheet no matter how much the sheet is stretched up to the point of rupture.

By varying the type of coated composition which is used it is obvious that the degree of stretchability and pliability of the coating can be readily adjusted depending upon the degree of stretch to which the Pliofilm may be subjected in use. For ordinary purposes and for general adaptability commercial Pliofilm coated with a wax-rubber composition containing, for example, 6 to about 30% by weight of rubber is highly satisfactory for most uses where heat sealed packages are produced therefrom by sealing the overlapped seams of the coated sheet by means of heat and pressure. Our coating composition is also satisfactory for producing sealed seams by use of mere pressure alone as the superposed coatings will coalesce sufficiently to form a bond when suitable pressure is applied. The use of heat in sealing Pliofilm packages may thus be entirely avoided with the complete elimination of ditsortion due to heat.

Very thin sheets of Pliofilm may also be coated with our thermoplastic coatings by first casting a film of Pliofilm of the lowest possible caliper, coating the film with our composition, and then heating and simultaneously stretching the coated film until the thickness of the coated sheet is reduced to the desired dimensions.

It is to be understood that numerous changes and modifications may be made in our invention which are intended to be claimed within the broadest scope of the appended claims.

We claim:

1. A rubber hydrochloride film having a flexible, highly stretchable thermoplastic coating comprising 94 to 70% by weight of a wax and 6 to 30% by weight of rubber-like film-forming constituent and having a relatively lower softening point than the rubber hydrochloride.

2. A rubber hydrochloride film having a highly stretchable thermoplastic coating of wax and rubber applied thereto, said composition containing from 94 to 70% by weight of a wax and 6 to 30% by weight of rubber and having a viscosity of at least 8,000 seconds (Scott viscosimiter) when applied to said rubber hydrochloric sheet.

3. A thin stretched base sheet of rubber hydrochloride having a thermoplastic stretched coating comprising 94 to 70% by weight of a wax and 6 to 30% by weight of rubber and having a lower softening point than the rubber hydrochloride sheet.

4. A method of coating films of rubber hydrochloride which comprises coating a film of rubber hydrochloride with a hot melt composition comprising 94 to 70% by weight of a wax and 6 to 30% by weight of rubber, simultaneously heating and stretching said coated film to reduce thickness of said film and coating while maintaining continuity of said coating.

ALLEN ABRAMS.
GEORGE W. FORCEY.
CHARLEY L. WAGNER.